United States Patent [19]

Nast

[11] Patent Number: 4,575,143

[45] Date of Patent: Mar. 11, 1986

[54] PICK-UP TOOL

[76] Inventor: Irving J. Nast, 217 N. Kenwood, Glendale, Calif. 91206

[21] Appl. No.: 657,598

[22] Filed: Oct. 4, 1984

[51] Int. Cl.[4] .................................................. B25J 1/00
[52] U.S. Cl. .................................... 294/65.5; 294/19.1
[58] Field of Search ........................ 294/65.5, 22, 50.8, 294/19.1, 66.2, 82.28, 99.1, 100, 104, 115, 116; 15/104.36

[56] References Cited

U.S. PATENT DOCUMENTS

| | | | |
|---|---|---|---|
| 2,976,075 | 3/1961 | Budreck | 294/65.5 |
| 3,146,015 | 8/1964 | Roberge | 294/65.5 |

*Primary Examiner*—James B. Marbert

*Attorney, Agent, or Firm*—James E. Brunton

[57] ABSTRACT

A combination magnetic and mechanical object manipulation and retrieval tool. The magnetic portion of the tool is tubular in shape and is coaxially aligned with the mechanical, prehensile portion of the tool. The magnetic portion of the tool, which surrounds the prehensile portion, includes an annular shaped face which extends substantially perpendicularly to the longitudinal axis of the tool. With this arrangement the magnetic portion of the tool augments the prehensile portion of the tool to permit objects disposed within a confined space to be easily maneuvered about so that they can either be removed by the magnet or conveniently aligned with and expeditiously gripped by the fingers of the prehensile portion of the device.

11 Claims, 3 Drawing Figures

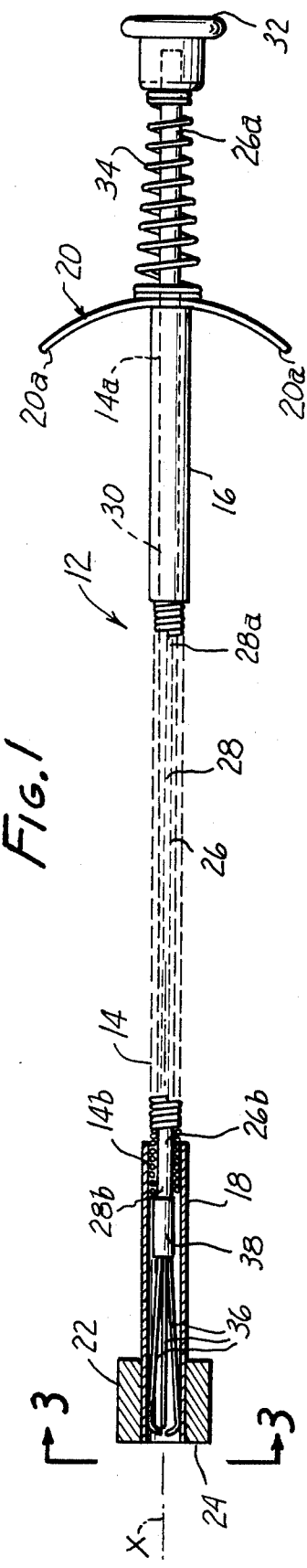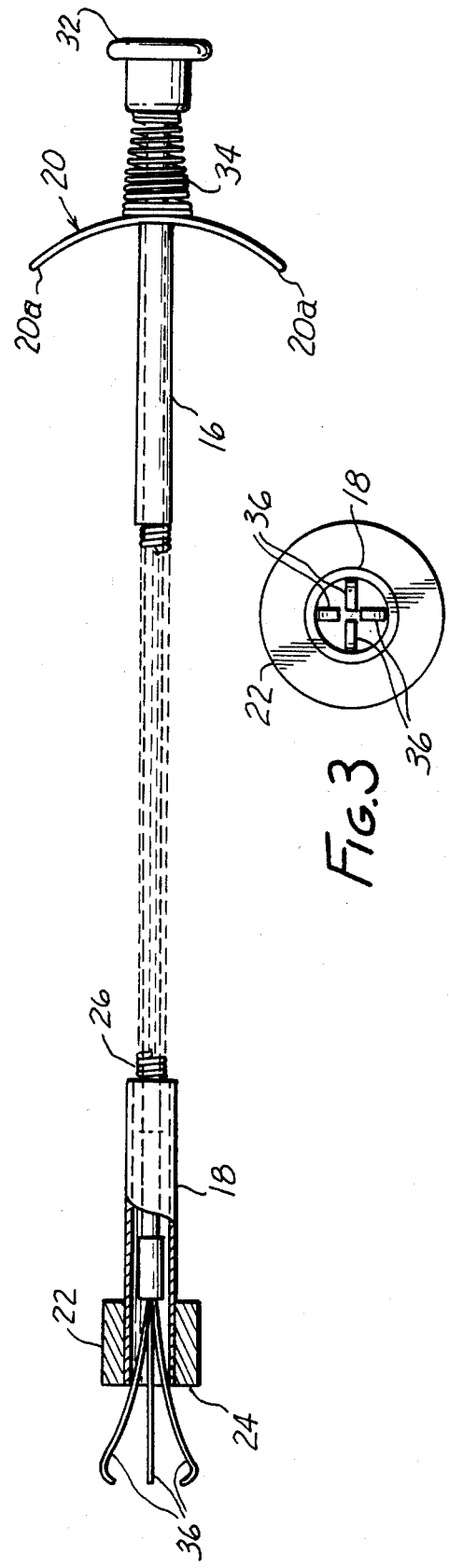

PICK-UP TOOL

BACKGROUND OF THE INVENTION

1. Field of the Invention

The present invention relates generally to mechanics' tools. More particularly the invention concerns a novel combination mechanical and magnetic manipulation and pick-up tool.

2. Discussion of the Prior Art

Many types of pick-up tools have been suggested in the past. Typically these tools are either magnetic, or they include some type of mechanical gripping finger arrangement which functions to pick-up the object to be retrieved. The U.S. patent to M. S. Dunkelberger, No. 2,320,967 discloses devices exemplary of this latter type of tool. The U.S. patent to J. T. Keys, No. 512,381 discloses devices exemplary of the former class of tool.

Both magnetic and mechanical devices are useful for particular applications, but each type of tool is lacking in versatility. The magnetic type tool can pick-up, or manipulate ferrous objects, but has no effect on objects made of non-ferrous metals. The mechanical tool, on the other hand, is useful in picking up ferrous and non-ferrous objects which are located so as to be readily accessible to the pick-up fingers of claws. However, such tools are generally useless in manipulating or moving the objects from one location to another. For example, if a nut or other small object to be retrieved is located proximate a wall, or in a corner of a closed chamber, often it cannot be reached by the gripping fingers of the mechanical tool and cannot be moved away from the wall or corner to a position where it is accessible to the gripping fingers.

Recognizing the lack of versatility of each of the two basic classes of tools, S. P. Winder devised a mechanical tool to which a magnetic element could be attached. This tool is disclosed in U.S. Pat. No. 2,947,564. However, in the Winter tool, when the magnetic attachment is in place the mechanical pick-up portion of the tool is rendered inoperative.

The present invention uniquely overcomes the drawbacks of the various prior art manipulation and pick-up tools by providing a combination magnetic and mechanical tool which provides at all times the advantages inherent in both types of tools. Because of the novel operable association between the prehensile, or gripping, portion of the tool and the magnetic portion of the tool, one does not interfere with the other and both can be used simulataneously to expeditiously manipulate and retrieve lost objects.

SUMMARY OF THE INVENTION

It is an object of the present invention to provide a dual action pick-up and manipulation tool in which the mechanical and magnetic portions of the tool uniquely cooperate with one another to expeditiously maneuver and retrieve lost objects from confined and hard to reach locations.

It is another object of the invention to provide a tool of the aforementioned character in which the prehensile and magnetic portions of the tool operate in a non-interfering manner and yet both are an integral part of the same tool.

More particularly, even through the prehensile and magnetic portions of the tool are independent, they can be used to augment each other in retrieving objects. For example, the magnetic portion of the tool, which surrounds and substantially encapsulates the prehensile portion, can be used to maneuver ferrous metal objects into an optimum position for retrieval by the magnet alone or for gripping and retrieval by the prehensile portion.

It is still another object of the invention to provide a combination tool of the class described in which the mechanical and magnetic portions of the tool are usuable simultaneously without any alteration, removal, or adjustment of the component parts of the tool.

Still another object of the invention is to provide a tool of the character described in the preceding paragraphs in which the magnetic portion of the tool can be removed and replaced with various sizes of magnets to meet varying circumstances without in any way disturbing the prehensile portion of the tool.

Yet another object of the invention is to provide a tool of the character described which is simple to use, embodies a minimum number of moving parts and is sturdy and highly reliable in use.

Finally it is an object of the invention to provide a tool of the aforementioned character which is expensive and can readily be mass produced in large volume in a variety of sizes.

BRIEF DESCRIPTION OF THE DRAWINGS

FIG. 1 is a longitudinal view of the pick-up tool of the present invention, partly in section to show internal construction.

FIG. 2 is a longitudinal view partly in section, similar to FIG. 1, but showing the appearance of the tool when it has been moved into an article pick-up configuration.

FIG. 3 is an end view of the device taken along lines 3—3 of FIG. 1.

DESCRIPTION OF THE INVENTION

Referring to drawings and particularly to FIG. 1, the object manipulating and pick-up tool of the invention is generally designated by the numeral 12. In the embodiment of the invention shown in FIG. 1, the tool comprises an elongated generally flexible sleeve 14, having a longitudinal central axis X and first and second extremities 14a and 14b. Affixed proximate the first and second extremities of the sleeve, as by crimping or other suitable means, are first and second hollow tubular portions designated by the numerals 16 and 18. Connected to the first tubular portion 16 is finger-engaging means for engagement by the fingers of the users. In the present embodiment of the invention, this finger-engaging means is provided in the form of a transversely extending member 20, having inwardly turned extremities 20a.

Forming an important aspect of the present invention, is a magnet means, provided here in the form of a tubular shaped magnet 22, which is removably connected to the second tubular portion 18 of the device. The magnet 22 is disposed coaxially with the longitudinal axis of the sleeve of the tool and includes a generally flat, annular-shaped magnetic face 24, which is disposed in a plane substantially perpendicular to the longitudinal axis X of the sleeve. As will be discussed in greater detail hereinafter, the magnet 22 cooperates with the object gripping or prehensile means of the device to manipulate an object within a closed or hard to reach space, so that the coaxially disposed prehensile means can quickly and conveniently retrieve the lost object.

Carried within the elongated sleeve 12 for reciprocal movement therewithin between first and second positions is a reciprocating means, or shaft assembly, generally designated by the numeral 26. As indicated in FIG. 1 of the drawings, shaft assembly 26 has first and second ends 26a and 26b and includes an elongated intermediate flexible wire portion 28, having first and second ends 28a and 28b. Connected to end 28a is a rigid rod portion 30, which extends outwardly from tubular portion 16. Connected to end 28b is a prehensile means, the construction of which will presently be described. Portion 26 can be constructed of a length of spring steel wire, or the like, which is of smaller diameter than the inside diameter of sleeve 12. Rod portion 30 can be affixed to wire portion 28 by mechanical means, by brazing or by any other suitable means well known in the art. Affixed to the outboard end of rod portion 30 is a palm engaging means provided here in the form of a palm engaging knob 32, which is adapted to be comfortably received within the palm of the hand of the user. Disposed between the finger-engaging means, or member 20, and the palm-engaging knob 32 is biasing means for yieldably resisting movement of the shaft assembly toward the second position. In the embodiment of the invention here shown, this biasing means comprises a coil spring 34.

In the present form of the invention the previously mentioned prehensile means comprises four yieldably resilient fingers 36 which are movable from the first closed position illustrated in FIG. 1 to the second expanded position illustrated in FIG. 2. As best seen by also referring to FIG. 3, fingers 36 have inturned ends and are circumferentially spaced relative to one another by approximately 90'. The prehensile means, or fingers 36, can be interconnected with wire portion 28 by any suitable means such as a clamping sleeve 38 (FIG. 1) which is crimped to the ends of the fingers proximate one end and to the wire portion 28 proximate the other end.

OPERATION

With the device of the invention in the at rest configuration, shown in FIG. 1, it is ideally suited for use in manipulating ferrous articles from one position within a confined space to another to align the objects with the prehensile means or fingers 36. It is to be noted that in the at rest position the magnet 22 surrounds and substantially encapsulates the fingers 36. Because the magnet 22 is coaxially aligned with the prehensile means and includes the perpendicularly extending annular face 24 which is of a reasonably substantial area, ferrous objects can be readily maneuvered within the confined space to precisely align them with the prehensile means. The device is particularly useful when, for example, the object to be retrieved is in a corner or against a wall at a location where the prehensile means cannot reach it. In such a situation the magnet 22 is invaluable in manipulating the object away from a corner or from the wall to a location where it can either be retrieved by the magnet alone or be conveniently aligned with and then encompassed by the fingers in the extended configuration shown in FIG. 2.

When the object to be retrieved has been moved into a convenient location, the operator of the tool will grasp the device in a manner such that the fingers of one hand are curled under the finger-engaging means with the palm-engaging knob 32 resting against the cupped palm of the hand. A movement of the fingers toward the palm will then cause movement of the reciprocating means, or shaft assembly, from the first position to a second position against the urging of spring 34 with spring 34 moving into the close coupled configuration illustrated in FIG. 2. As the reciprocating means moves from the first position to the second position, the fingers 36 will move from the closed, encapsulated position shown in FIG. 1 to the extended, gripping position shown in FIG. 2. Because the fingers 36 are made of a resilient spring-like material, they will diverge from one another in the manner shown in FIG. 2 as they move outwardly with respect to the sleeve 18 and magnet 22. In this expanded position, the fingers can be positioned around the object to be retrieved. By then releasing the gripping pressure exerted by the fingers on the finger-engaging means 20, spring 34 will urge the reciprocating means to move toward its first, or starting position, causing the fingers to once again move toward one another. As the fingers move toward their closed position they will securely grip the object so that it can be lifted from the enclosed space and expeditiously retrieved.

For certain applications magnet 22 can be removed from sleeve 18 and replaced with a magnet of larger or smaller size. Also for certain applications magnet 22 can be replaced by an electromagnet. In any case, however, the magnet in no way interferes with the operation of the prehensile means or vice versa.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. An object manipulating and pick-up tool comprising:
 (a) an elongated assembly having a longitudinal passageway therethrough and first and second end portions, at least a portion of said second end portion being stationary and magnetic;
 (b) finger engaging means connected proximate said first end portion of said sleeve assembly for engagement by the fingers of the user;
 (c) reciprocating means carried within said assembly for reciprocating movement within said passageway between first and second positions, said reciprocating means having a first and a second end, said first end extending from said sleeve assembly a limited distance;
 (d) palm engaging means connected proximate said first end of said reciprocating means for engagement by the palm of the user; and
 (e) prehensile means connected at said second end of said reciprocating means for gripping objects when said reciprocating means is moved between said first and second positions, said prehensile means being at least partially encapsulated within said stationary magnetic portion of said assembly when said reciprocating means is in said first position and being movable relative to said stationary magnetic portion.

2. An object manipulating and pick-up tool comprising:
 (a) an elongated sleeve having a longitudinal central axis and first and second extremities;

(b) finger engaging means connected proximate said first extremity of said elongated sleeve for engagement by the fingers of the user;

(c) a tubular shaped magnetic means connected proximate said said second extremity of said elongated sleeve, said magnetic means including a generally flat, annular shaped magnetic face disposed in a plane substantially perpendicular to the longitudinal axis of said sleeve;

(d) reciprocating means carried within said elongated sleeve for reciprocating movement between first and second positions, said reciprocating means having a first and a second end, said first end extending from said elongated sleeve a limited distance;

(e) palm engaging means connected proximate said first end of said reciprocating means for engagement by the palm of the user; and (f) prehensile means connected at said second end of said reciprocating means for gripping objects when said reciprocating means is moved between said first and second positions, said prehensile means being encapsulated within said elongated sleeve and said magnet means when said reciprocating means is in said first position.

3. An object manipulating and pick-up tool as defined in claim 2 in which said reciprocating means comprises:
  (a) an elongated intermediary portion having first and second ends; and
  (b) a rigid, rod portion connected to said first end of said intermediary portion.

4. An object manipulating and pick-up tool as defined in claim 3 in which both said elongated sleeve and said elongated intermediary portion are flexible.

5. An object manipulating and pick-up tool as defined in claim 2 in which said prehensile means comprises a plurality of yieldable fingers movable between a first closed position and a second expanded position upon movement of said reciprocating means between said first and second positions.

6. An object manipulating and pick-up tool as defined in claim 5, including biasing means disposed between said finger engaging means and said palm engaging means for yieldably resisting movement of said reciprocating means toward said second position.

7. An object manipulating and pick-up tool comprising:
  (a) an elongated generally flexible sleeve having a longitudinal central axis and first and second extremities;
  (b) first and second tubular portions connected proximate said upper and lower extremities of said sleeve;
  (c) finger engaging means connected to said first tubular portion of said elongated sleeve for engagement by the fingers of the user;
  (d) a stationary tubular shaped magnet connected to said second tubular portion of said elongated sleeve, said magnet including a generally flat, annular shaped magnetic face disposed in a plane substantially perpendicular to the longitudinal axis of said sleeve.
  (e) a shaft assembly carried within said elongated sleeve for reciprocating movement therewithin between first and second positions, said shaft assembly having a first and a second end, said first end extending from said elongated sleeve a limited distance;
  (f) a palm engaging knob connected proximate said first end of said shaft assembly for engagement by the palm of the user; and
  (g) prehensile means connected at said second end of said shaft assembly for gripping objects when said shaft assembly is moved between said first and second positions said prehensile means being encapsulated within said elongated sleeve when said reciprocating means is in said first position and being movable relative to said stationary magnet.

8. An object manipulating and pick-up tool as defined in claim 7 in which said shaft assembly comprises:
  (a) an elongated intermediary flexible wire portion having first and second ends; and
  (b) a rigid, rod portion connected to said first end of said intermediary flexible wire portion.

9. An object manipulating and pick-up tool comprising:
  (a) an elongated generally flexible sleeve having a longitudinal central axis and first and second extremities;
  (b) first and second tubular portions connected proximate said first and second extremities of said sleeve;
  (c) finger engaging means connected to said first tubular portion for engagement by the fingers of the user;
  (d) a tubular shaped magnet connected to said second tubular portion of the device, said magnet being coaxial with said longitudinal central axis of said sleeve and including a generally flat, annular shaped magnetic face disposed in a plane substantially perpendicular to the longitudinal axis of said sleeve;
  (e) a shaft assembly carried within said elongated sleeve for reciprocating movement therewithin between first and second positions, said shaft assembly comprising:
    (i) an elongated intermediary flexible wire portion having first and second ends; and
    (ii) a rigid, rod portion connected to said first end of said intermediary flexible wire portion;
  (f) a palm engaging knob connected proximate said first end of said rod portion for engagement by the palm of the user;
  (g) biasing means disposed between said finger engaging means and said palm engaging knob for yieldably resisting movement of said shaft assembly toward said second position;
  (h) prehensile means connected at said second end of said flexible wire portion for gripping objects when said shaft assembly is moved between said first and second positions, said prehensile means being encapsulated within said elongated sleeve and said magnet when said reciprocating means is in said first position and comprising at least two yieldable fingers movable between a first closed position and a second expanded position upon movement of said shaft assembly between said first and second positions.

10. An object manipulating and pick-up tool as defined in claim 9 in which said biasing means comprises a coil spring coaxially aligned with said longitudinal central axis of said elongated sleeve.

11. An object manipulating and pick-up tool as defined in claim 9 in which said finger engaging means comprises a transversely extending member having inwardly turned extremities adapted to recive the fingers of the user.

* * * * *

UNITED STATES PATENT AND TRADEMARK OFFICE
CERTIFICATE OF CORRECTION

PATENT NO. : 4,575,143

DATED : March 11, 1986

INVENTOR(S) : Irving J. Nast

It is certified that error appears in the above-identified patent and that said Letters Patent is hereby corrected as shown below:

Column 2, line 22, delete [expensive] and insert therefor

--inexpensive--.

Column 5, line 5, delete [said], first appearance.

Signed and Sealed this

Twenty-ninth Day of July 1986

[SEAL]

Attest:

Attesting Officer

DONALD J. QUIGG

Commissioner of Patents and Trademarks